(12) United States Patent
Lee

(10) Patent No.: US 11,006,780 B2
(45) Date of Patent: May 18, 2021

(54) HOT DOG ROLLER AND GRILL BASKET

(71) Applicant: Bright Innovations LLC, Westminster, CA (US)

(72) Inventor: David M. Lee, Westminster, CA (US)

(73) Assignee: BRIGHT INNOVATIONS LLC, Westminster, CA (US)

( * ) Notice: Subject to any disclaimer, the term of this patent is extended or adjusted under 35 U.S.C. 154(b) by 306 days.

(21) Appl. No.: 15/954,016

(22) Filed: Apr. 16, 2018

(65) Prior Publication Data
US 2018/0360266 A1 Dec. 20, 2018

Related U.S. Application Data

(60) Provisional application No. 62/485,959, filed on Apr. 16, 2017.

(51) Int. Cl.
*A47J 37/04* (2006.01)
*A47J 43/18* (2006.01)

(52) U.S. Cl.
CPC .......... *A47J 37/044* (2013.01); *A47J 37/049* (2013.01); *A47J 43/18* (2013.01)

(58) Field of Classification Search
CPC ......... A47J 37/044; A47J 43/18; A47J 37/049
See application file for complete search history.

(56) References Cited

U.S. PATENT DOCUMENTS

| | | | | |
|---|---|---|---|---|
| 1,507,733 A | * | 9/1924 | Harding | A47J 37/0694 99/400 |
| 2,682,830 A | * | 7/1954 | Kupchik | A47J 37/049 99/397 |
| 2,925,771 A | * | 2/1960 | Avetta | A47J 37/0688 99/393 |
| 3,641,922 A | * | 2/1972 | Nachazel | A47J 37/0772 99/340 |

(Continued)

OTHER PUBLICATIONS

Home Depot,"Charcoal Companion Non-Stick Rectangle Grilling Basket—CC3013", Retrieved at <<https://www.homedepot.com/p/Charcoal-Companion-Non-Stick-Rectangle-Grilling-Basket-CC3013/205549838?cm_mmc=Shopping%7cTHD%7cgoogle%7c&mid=s2vnAZFZM%7cdc_mtid_890338a25189_pcrid_176899657641_pkw_pmt_product_205549838_slid_&gclid=CjwKCAjwk9HWBRApEiwA6mKWaRV6jQ-6gx_iUYLrMmZIUL— Retrieved Date: Apr. 17, 2018, 3 pages.

(Continued)

*Primary Examiner* — Sarang Afzali
(74) *Attorney, Agent, or Firm* — Medley, Behrens & Lewis LLC; Lorri W. Cooper

(57) ABSTRACT

A food grilling device includes a lower portion for holding food, an upper portion for trapping food between the upper and lower portions, and a sliding, adjustment mechanism. The upper portion is positioned over the lower portion and is movable relative to the lower portion. The sliding, adjustment mechanism is coupled between the lower portion and the upper portion and permits the upper portion to move (Continued)

forward, rearwardly, upwardly, and downwardly relative to the lower portion. The food grilling device has an open position and a closed position. In the open position, food is inserted between the lower and upper portions. In the closed position, food is trapped in the food grilling device by pressure or friction exerted on the food by the upper portion. Movement of the upper portion relative to the lower portion in a forward and rearward direction turns the food positioned between the upper and lower portions.

14 Claims, 12 Drawing Sheets

(56) References Cited

U.S. PATENT DOCUMENTS

| | | | | |
|---|---|---|---|---|
| 4,005,646 A | * | 2/1977 | Kruper | A47J 37/049 |
| | | | | 99/427 |
| 4,526,158 A | * | 7/1985 | Lee | A47J 37/0763 |
| | | | | 126/25 A |
| 5,664,483 A | * | 9/1997 | Yip | A47J 37/08 |
| | | | | 99/385 |
| 2011/0177215 A1 | * | 7/2011 | Bartlett | A47J 37/044 |
| | | | | 426/143 |

OTHER PUBLICATIONS

Aliexpress, "New DIY Non-stick Triple Fish Grilling Basket w/ Wood Handle Outdoor BBQ Grilling Fish Rack Barbecue Tool Fish Grill Net", Retrieved at: <<https://www.aliexpress.com/item/Non-stick-Triple-Fish-Grilling-Basket/1836741388.html>>, Retrieved Date: Apr. 17, 2018, 3 pages.

Craftsmanspace, "Grilling Basket Plan", Retrieved at: <<http://www.craftsmanspace.com/free-projects/grilling-basket-plan.html>>, Retrieved Date: Apr. 17, 2018, 6 pages.

Google, "Grilling Basket", Retrieved at: <<https://www.google.com/search?q=grilling+basket&source=lnms&tbm=isch&sa=X&ved=0ahUKEwik0PuP3b_aAhUD3FMKHanmCbQQ_AUICygC&biw=1662&bih=874#imgrc=OZAsZBEEY0lesM:>>, Retrieved Date: Apr. 17, 2018, 4 pages.

* cited by examiner

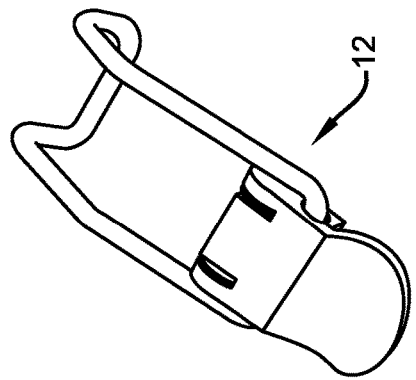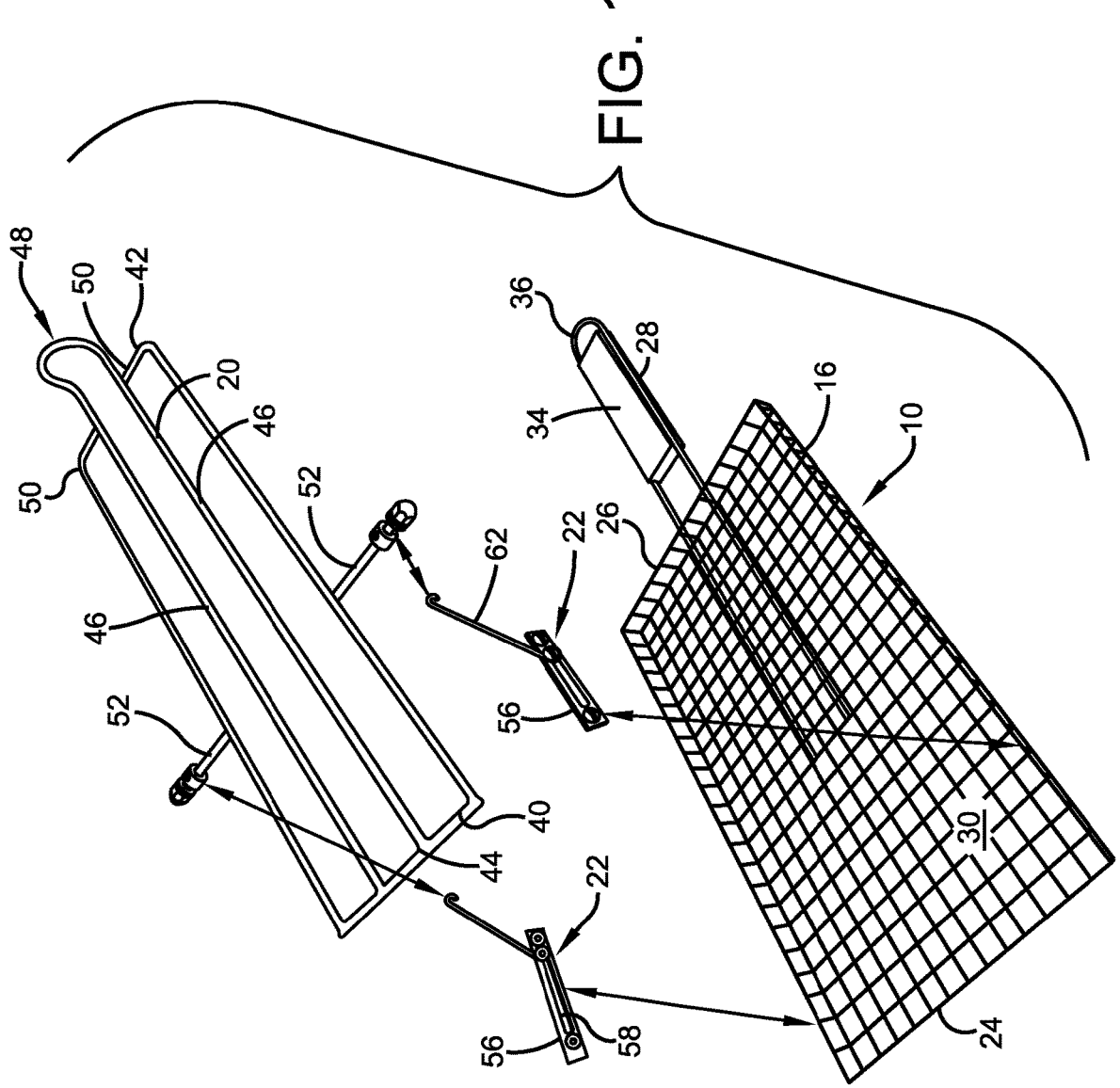

HOT DOG ROLLER AND GRILL BASKET

CROSS-REFERENCE TO RELATED APPLICATION

This application claims priority to U.S. Provisional Application No. 62/485,959, filed on Apr. 16, 2017, the disclosure of which is incorporated herein by reference in its entirety.

FIELD

The present invention concerns a grill basket that can be used to turn or roll foods for even cooking or to cook other foods over a heat source.

BACKGROUND

In cooking hot dogs on a grill, hot dogs often cook unevenly. When a user attempts to roll them, they often roll back to their original position, resulting in overcooking on one side of the hot dog and insufficient cooking on the opposite side. Hot dogs also tend to roll off a grill surface without notice, sometimes ending up on the floor.

Hot dog roller machines are known. They are typically electrically operated machines that have side-by-side rollers that are coupled with a heat source. Hot dogs are positioned between the rollers. The hot dogs cook while being rolled on the heated rollers.

One grilling tool for use in rolling hot dogs is known for use on a barbeque grill. That device is similar to the known electrically operated hot dog rollers in that it includes rollers that are positioned side-by-side. A user places hot dogs between the rollers and is required to manually roll each hot dog individually to ensure even cooking. The hot dogs sit on top of the rollers, but may be prone to falling off the device, especially when being carried.

SUMMARY

A hot dog roller and grill basket is shown and described herein.

BRIEF DESCRIPTION OF THE DRAWINGS

FIG. 11 is an exploded view of the device shown in FIG. 1;

FIG. 13 is a perspective view of a type of hook or clip that may be utilized to hook the upper portion to the lower portion.

DETAILED DESCRIPTION

Figure 1:
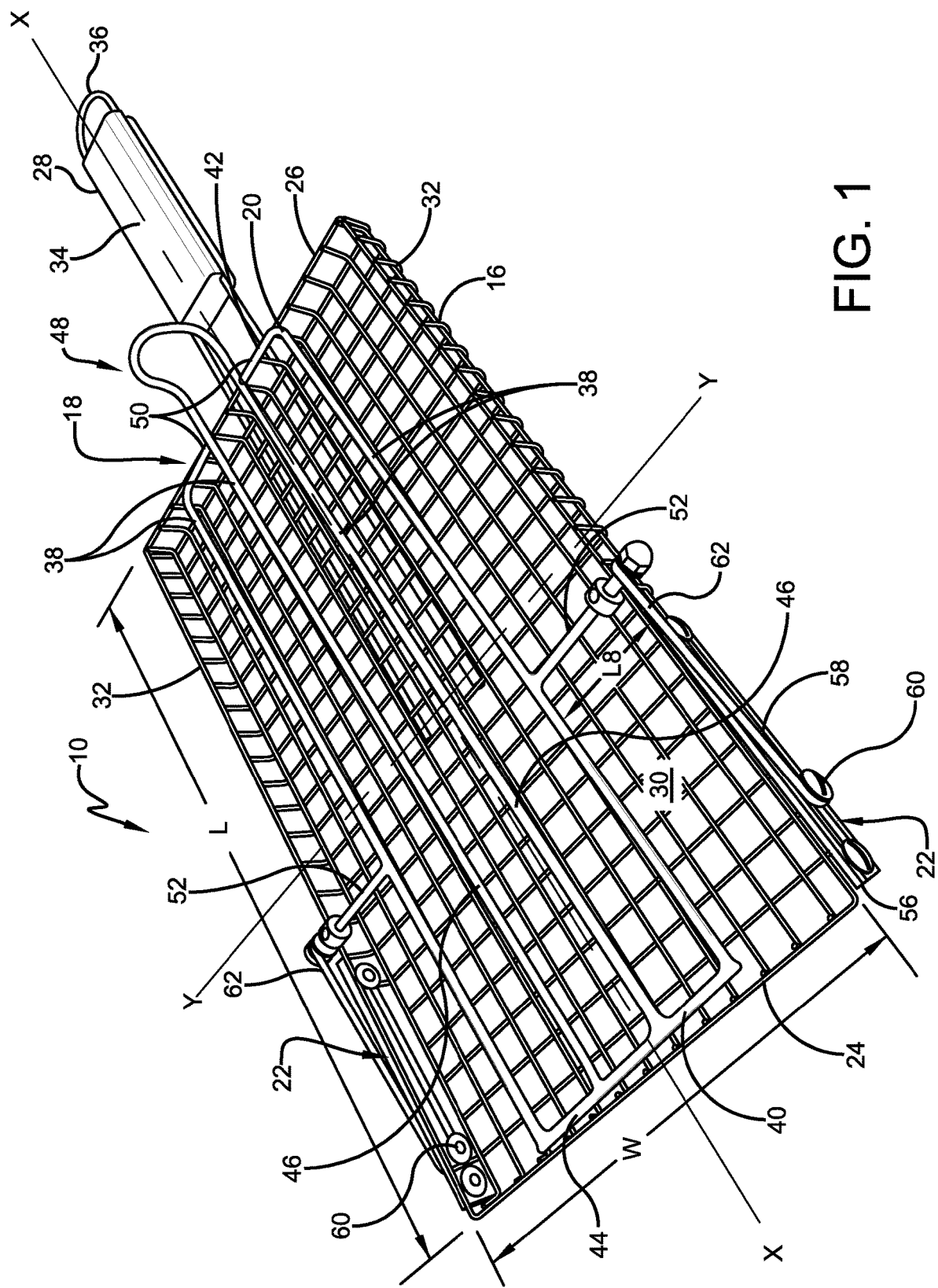
FIG. 1 is a perspective view of an embodiment of the hot dog roller and grill basket according to the invention.
Figure 2:
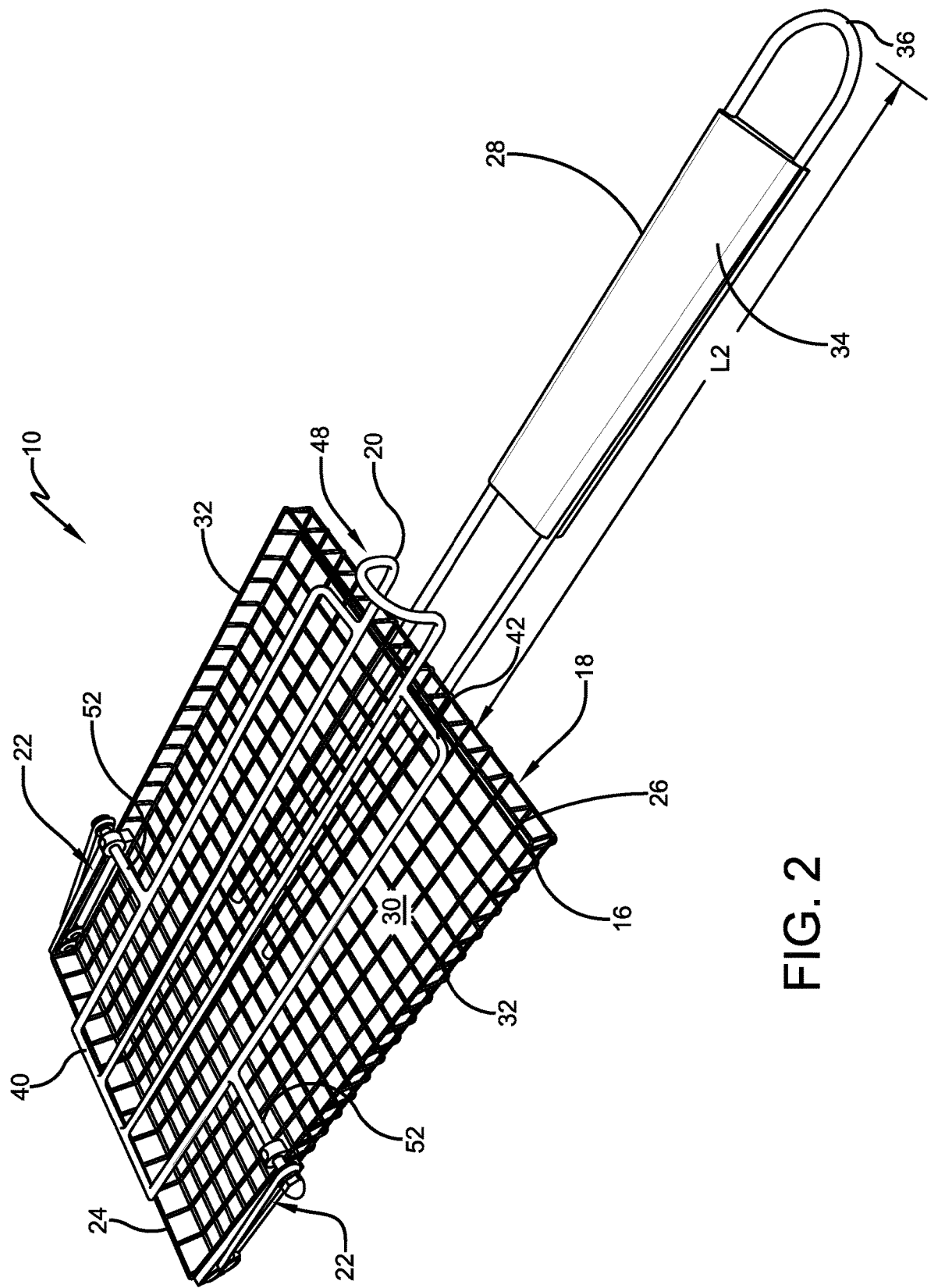
FIG. 2 is another perspective view from a different angle of the device of FIG. 1.
Figure 3:
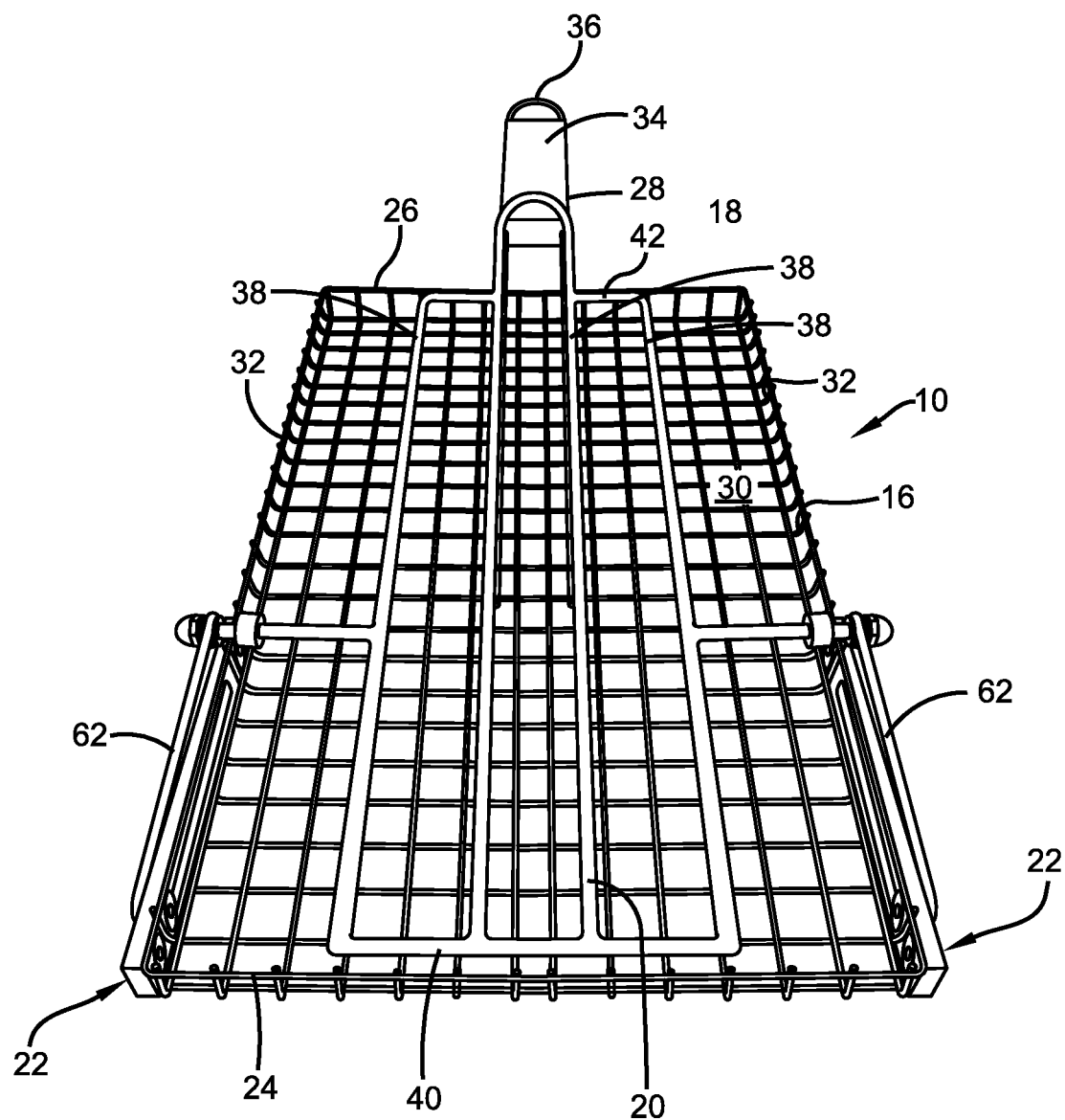
FIG. 3 is a top perspective view of the device of FIG. 1.

The example grilling basket device 10 discussed herein is primarily discussed in the context of hot dogs. Hot dogs 2 are used as an example of one type of food that may be successfully cooked on a grill using the herein described grilling basket device 10. Other types of foods may also be cooked using the device, such as meatballs, sausages, corn-on-the-cob, vegetables, and other foods and meats that can be rolled. Thus, when applicant uses the word "hot dog" in describing the operation and or function of the example grilling basket device 10, it should be understood that any other type of food suitable to be cooked and turned on a grill may alternatively be substituted therefore. Applicant uses the word "hot dog" throughout for efficiency sake.

While the device 10 is particularly well suited for use in grilling foods that need to be rotated by being rolled, the device 10 can also be used for other foods that are not rolled, such as grilled vegetables, hamburgers, and other non-round foods. In the case when non-rolling foods are used, the user opens the device 10 and may use a spatula, fork, or other means to flip the food in the device 10. Thus, the invention is directed primarily toward food that can be rolled during grilling, but it should be recognized that the device 10 can also be used as a grilling basket 10 to grill other types of foods. In addition, when it is useful to lock the food in the grilling basket 10, the device 10 may include a locking mechanism 12 that helps to lock the food in the device 10 during cooking and for transport after cooking.

The example hot dog roller and grilling basket 10 is a grilling tool used to cook food on a heat source, such as a barbeque grill. In a first embodiment, the grilling basket 10 has an open position 14 that permits a user to insert hot dogs 2 (or other types of food) onto a lower portion 16 of the grilling basket 10. Then, in a closed position 18, the hot dogs 2 are sandwiched under an upper portion 20 of the grilling basket 10 that is coupled to a sliding hinge or joint 22 that joins the upper 20 and lower portions 16 together. The lower portion 16 of the grilling basket 10 has a length L and a width W, with the length L typically being longer than the width W. A longitudinal axis X-X is defined along the length L of the lower portion 16, and a transverse axis Y-Y is defined across the width W of the lower portion 16, with the transverse axis Y-Y being perpendicular to the longitudinal axis X-X.

The upper portion 20 of the grilling basket 10 is movable between a front edge 24 of the lower portion 16 and a rear edge 26 of the lower portion 16. The upper portion 20 is movable forward and back along the longitudinal axis X-X. When the upper portion 20 of the basket 10 is engaged with hot dogs 2 that are seated in the lower portion 16 and the upper portion 20 is moved, the hot dogs 2 roll an amount consistent with the travel length of the upper portion 20 of the grilling basket 10. This permits a user to roll multiple hot dogs 2 at a time in a consistent manner, while trapping the hot dogs 2 in position so that they are unable to roll back to their starting position. The example device 10 promotes efficient and even heating or cooking of the hot dogs 2.

Referring to FIGS. 1-9 and 11-12, an example grilling basket 10 includes a lower portion 16, an upper portion 20, a sliding hinge or joint mechanism 22 that couples the upper and lower portions 20, 16 of the grilling basket 10, and a carrying handle 28 that extends from the rear edge 26 of the lower portion 16 and is coupled to the lower portion 16. The lower portion 16 is a tray like member that is shaped like a basket in that it has a bottom wall 30 and four upstanding side walls 32 that surround the bottom wall 30. The lower portion 16 of the tray is shown as being shallow in height H, with one embodiment having a height of approximately 0.5-1.0 inches. The walls 30, 32 of the lower portion 16 are formed from wires to form a basket that has openings between the respective wires, as is well known in the wire baskets field. The wires are spaced from one another in a grid that extends in both the longitudinal X-X and transverse Y-Y directions. The spacing between the wires is such that food may be positioned and held in the grilling basket 10 without falling through the openings in the grilling basket 10. The spacing of the wires in the grilling basket 10 is something that one of skill in the art can readily determine.

The embodiment depicted is designed for use with hot dogs 2, which are not typically very thick. However, there may be instances when the lower portion 16 of the grilling basket 10 has side walls 32 that are greater than those shown, such as when the food to be cooked is thicker. An example of thicker food may include corn-on-the-cob, sausages, or meatballs, for example. When thicker food is anticipated to be cooked with the device, the parts of the device can be adjusted in size and girth to accommodate the food's size, as known by those of skill in the art. For example, for corn-on-the-cob, the weight is greater than the weight of hot dogs 2. Thus, it may be necessary to increase the strength and size of some of the parts, as will be readily recognized by those of skill in the art.

The carrying handle 28 is coupled to the lower portion 16 and is referred to herein as the lower handle 28. The lower handle 28 is coupled to and extends along the longitudinal axis X-X outwardly from the rear edge 26 of the lower portion 16 of the grilling basket 10. The lower handle 28 is aligned in substantially the same plane as the bottom wall 30 of the lower portion 16. The lower handle 28 may be in any shape desired. In the example shown, the lower handle 28 is formed by a metal frame that holds a wooden member 34. The lower handle 28 is shown as being of a length L2 that is similar to the length L of the lower portion 16 of the grilling basket 10. A longer lower handle 28 is advantageous when dealing with a grilling surface because a user can then grasp the lower handle 28 at a point that is spaced away from the grilling/heat area, avoiding any possibility of burns. As an alternative, a shorter lower handle could be used, or handles could be positioned at opposite ends 24, 26 of the lower portion 16 of the grilling basket 10, or along the sides of the lower portion 16 of the grilling basket 10. Yet another alternative, which is not shown, a handle could be positioned on the upper portion 20 of the grilling basket 10 such that the user can grab the handle above the grilling basket 10 and lift it from the grilling surface.

The lower handle 28 shown is formed in a loop that is open at a rear end thereof 36 that is spaced from the grilling basket 10, with the wooden member 34 sandwiched between the two sides of the loop. The lower handle 28 is coupled to the rear edge 26 of the grilling basket 10 in any known manner, such as by welding, for example. The lower handle 28 may be coupled to the lower portion 16 in any known manner. Any type of handle may be utilized. For example, a fully metal handle could be utilized, but may be prone to heating up. A combination of a metal and a plastic handle could be used, as long as the plastic material can withstand temperatures associated with cooking. A silicone material could be used on the handle without a wood, metal or plastic base, or could cover all or part of a wood, metal, or plastic base. Other types of materials, as known by those of skill in the art, could alternatively be used. In addition, the lower handle 28 could be foldable or removable from the grilling device 10. A foldable or removable lower handle 28 would provide for more compactness and greater ease of storage. Any type of foldable lower handle 28 design may be used. Any type of known mechanisms can be used to make the lower handle 28 removable.

The upper portion 20 of the grilling basket 10 is shown to be a generally planar member that is formed in a grid utilizing wires or rods 38 that are thicker than those used for the lower portion 16 of the grilling basket 10. Because fewer wires are used, the thicker, more rigid rod members 38 of the upper portion 20 are advantageous in that they help to support, stabilize, and hold the shape of the upper portion 20. It is advantageous for the upper portion 20 to be substantially rigid because is assists in rolling the food 2 in the lower portion 16 of the grilling basket 10. Alternatively, it is possible to use a wire grid for the upper portion 20 (not shown) that has a greater number of wire supports and that may be thinner in structure than those shown in the figures. For example, the wires in this alternative embodiment of the upper portion 20 could have a similar size and thickness as the wires used in the lower portion 16 of the grilling basket 10, if desired, as long as the combination of wires is rigid enough to permit the upper portion 20 to exert pressure on an underlying food item 2 so that the food item rolls when the upper portion 20 is moved longitudinally.

The upper portion 20 is shown as having four longitudinally extending rib-like members 38 that are coupled at the front and rear ends 40, 42 by a transversely extending cross-beam 44. At the front end 40 of the upper portion 20, a transversely extending cross-beam or rod 44 is coupled to the ends of the longitudinally extending beams or rods 38. At the rear end 42 of the upper portion 20, the central two longitudinally extending members 46 are curved upwardly and coupled together in a loop shape to provide an upper handle 48 for moving the upper portion 20 longitudinally in a front and rear direction 40, 42. The outer two support rods 38 are coupled to the inner two support rods 46 by a transverse cross-beam 50. The beams 50 may be coupled together in any known manner, for example, by welding.

Transversely and outwardly extending rods 52 extend from both of the longitudinally extending outer beam or rod supports 38 of the upper portion 20 and provide the upper portion 20 with a width W that is substantially the same as the lower portion 16. The outwardly extending rods 52 are coupled to the upper portion 20 in a central area, as defined along the length L3 of the upper portion 20. The two outwardly extending rods 52 couple the upper portion 20 to the lower portion 16 via a sliding mechanism 22 that permits the upper portion 20 to move both upwardly and longitudinally relative to the lower portion 16.

Figure 4:
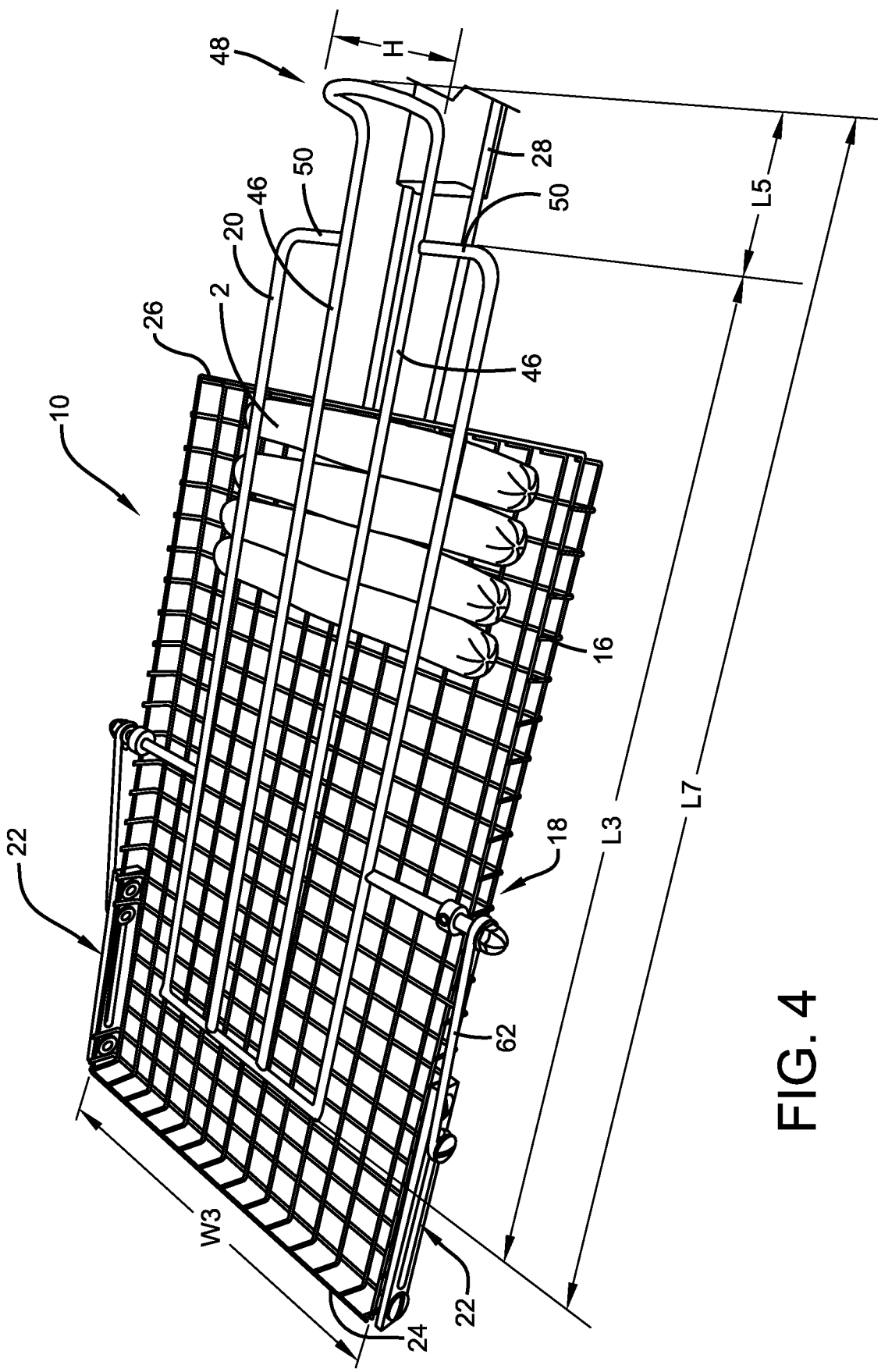
FIGS. 4-6 are perspectives views of the device depicting the operation of the device of FIG. 1, with FIG. 4 depicting hot dogs installed in the device in a first position, FIG. 5 depicting hot dogs installed in the device in an intermediate second position after having been rolled by the device, and FIG. 6 depicting hot dogs installed in the device in a third position after having been rolled into position by the device.
Figure 5:
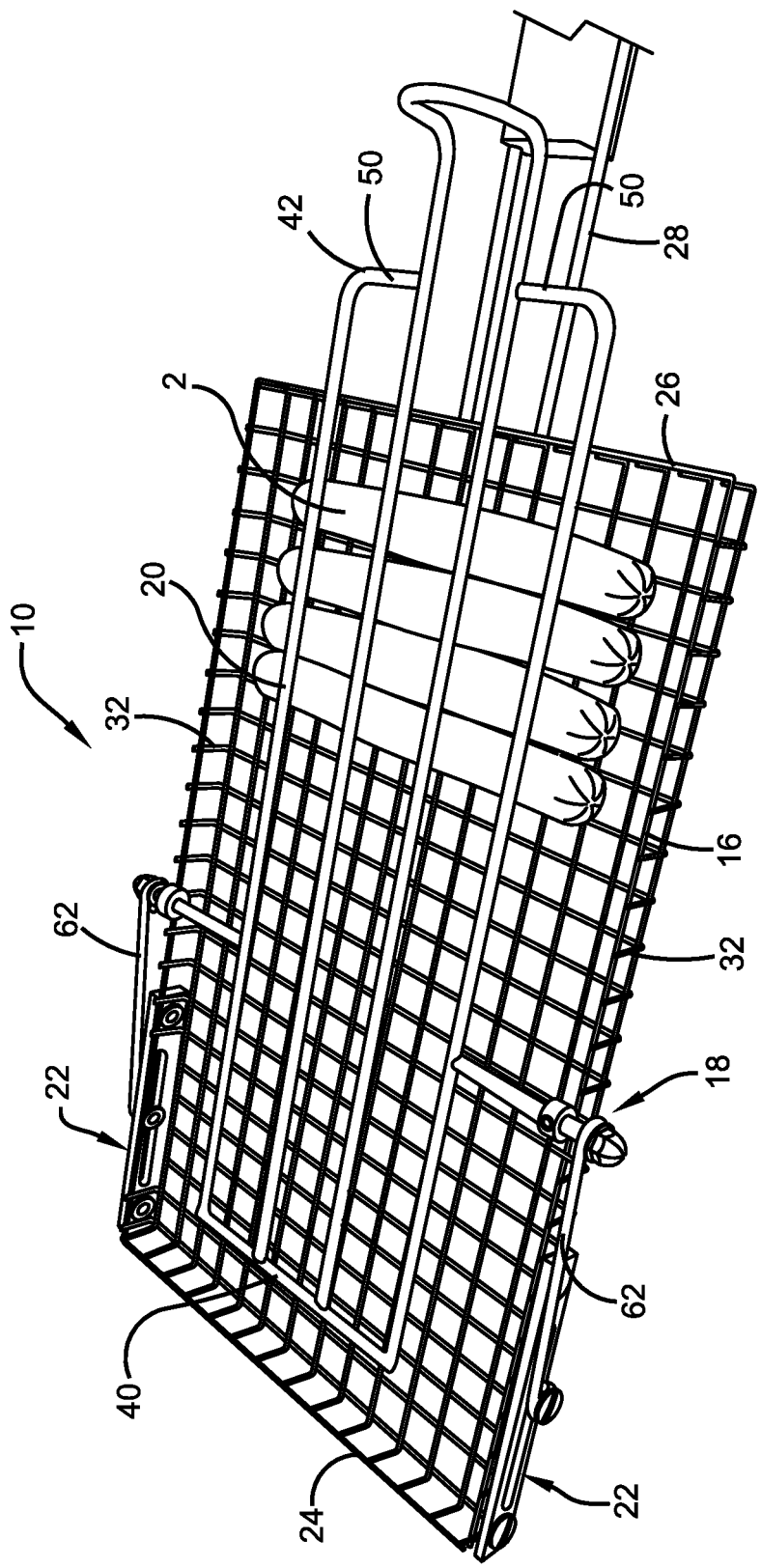
Figure 6:
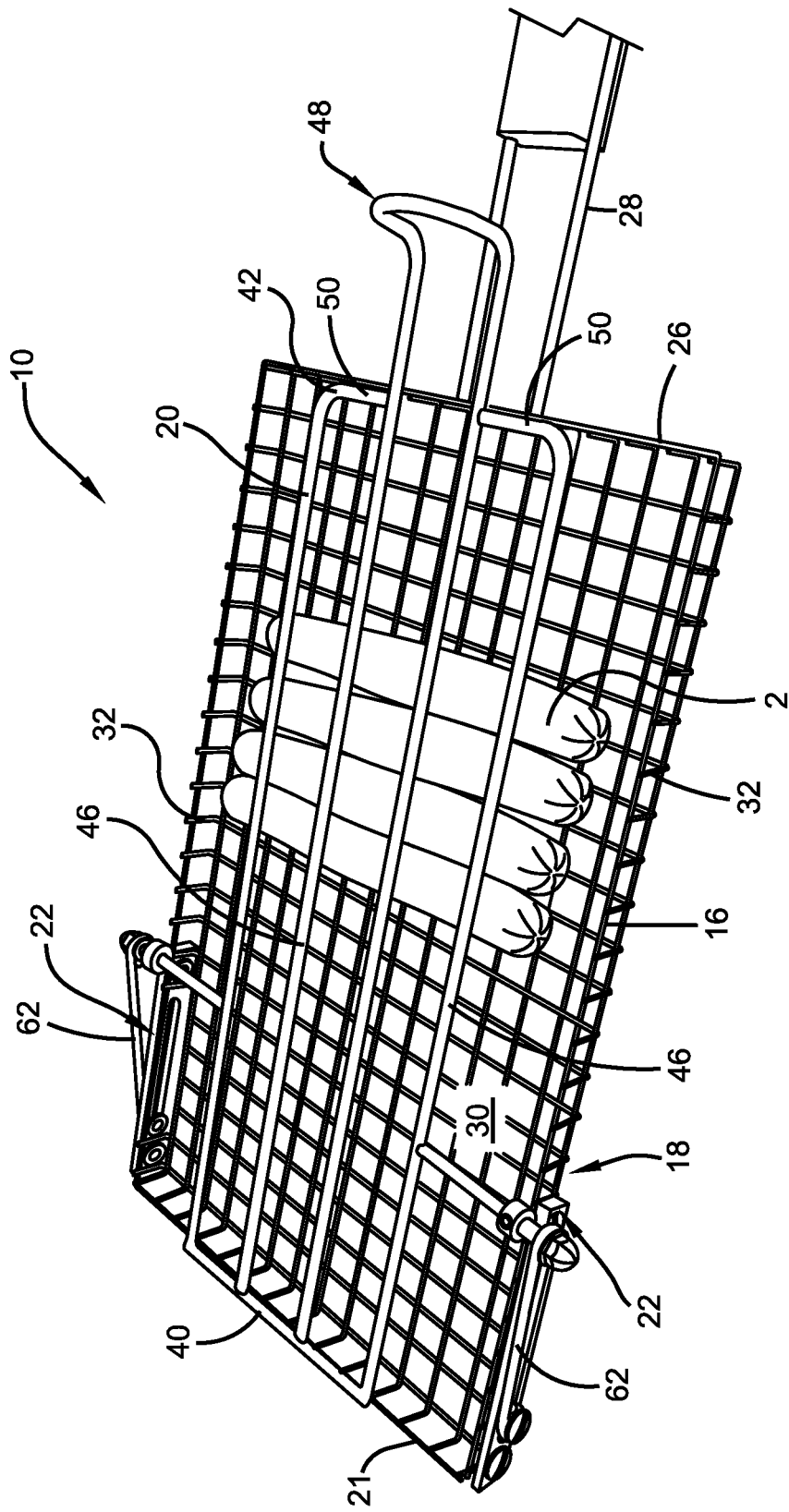

Referring now to FIGS. 4-6, the operation of the device 10 is depicted when food, in this case hot dogs 2, are positioned in the lower portion 16 with the upper portion 20 positioned in a closed position 18 so that it contacts the hot dogs 2. FIG.

4 shows the upper portion 20 in the fully extended rearmost position, where the slide mechanism 22 is positioned at its most rearward position. FIG. 5 shows the upper portion 20 in an intermediate position where the upper portion 20 is positioned between the rearmost position and a front position of the lower portion 16. As is evident, when the upper portion 20 is slid forwardly along the slider mechanism 22, which will be discussed in greater detail below, the hot dogs 2 roll over and are moved forwardly in the lower portion 16. FIG. 6 shows the upper portion 20 in a forward-most position, where the upper portion 20 is extended forwardly as far as it is permitted to move by the slider 22.

Again, when the upper portion 20 is slid forwardly along the slider 22, the hot dogs 2 roll over and are moved forwardly in the lower portion 16 of the grilling basket 10, as is evident from the position of the hot dogs 2 in the lower portion 16 in FIGS. 5 and 6. In some cases, it may be advantageous to press down lightly on the upper portion 20 as it is moved forwardly to exert greater pressure on the hot dogs 2 so that they will roll more easily. Thus, numerous hot dogs 2 may be rolled within a grilling basket 10 without have to physically touch the hot dogs 2. In addition, because of pressure exerted on the hot dogs 2 by the upper portion 20, the hot dogs 2 will maintain their position once rolled and will not be prone to rolling back to their prior position, as often happens when hot dogs 2 are placed on a grill.

Figure 7:
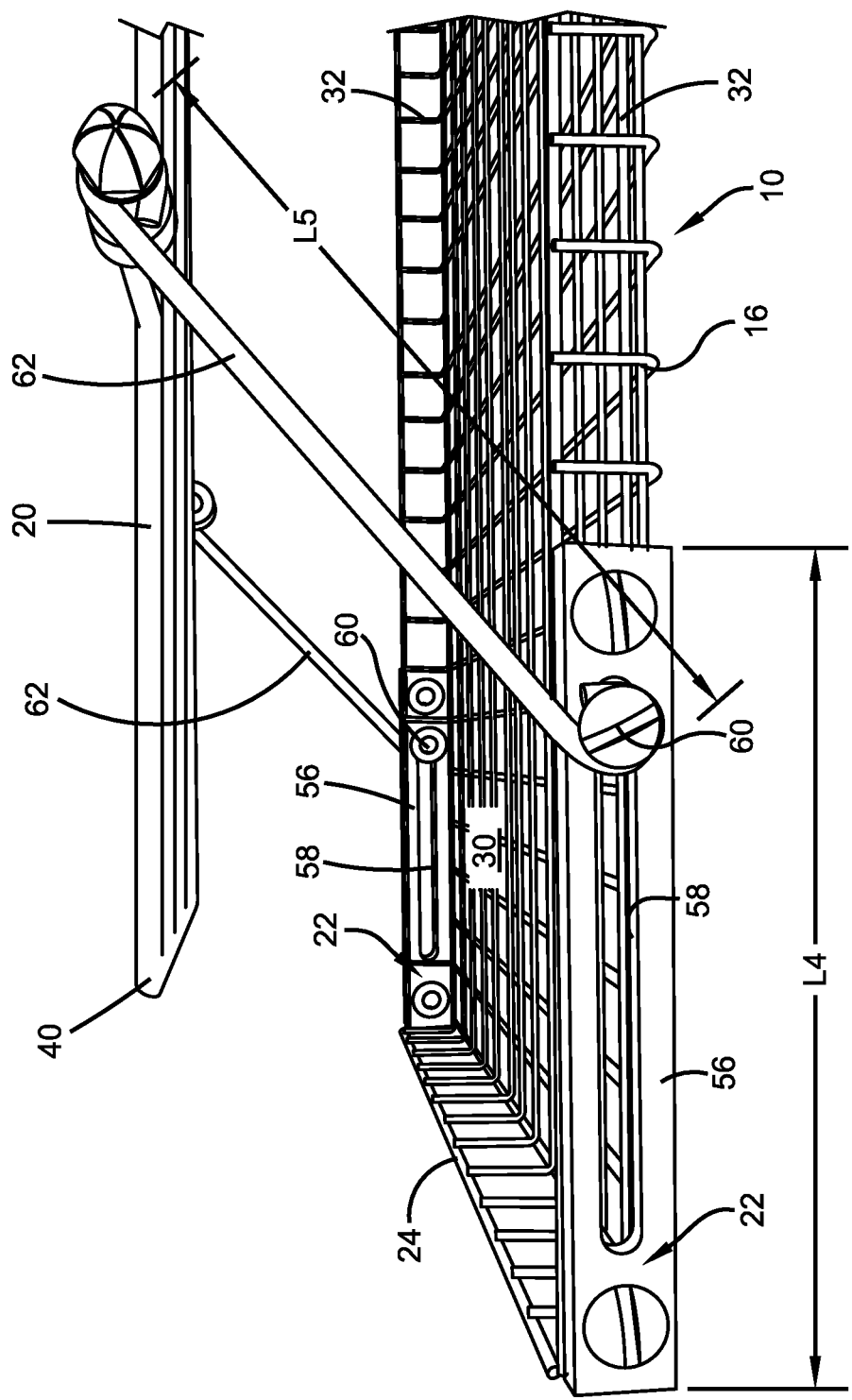
FIG. 7 is an enlarged side view of the device depicting the sliding mechanism that is used to move an upper portion of the device relative to a lower portion of the device.
Figure 8:
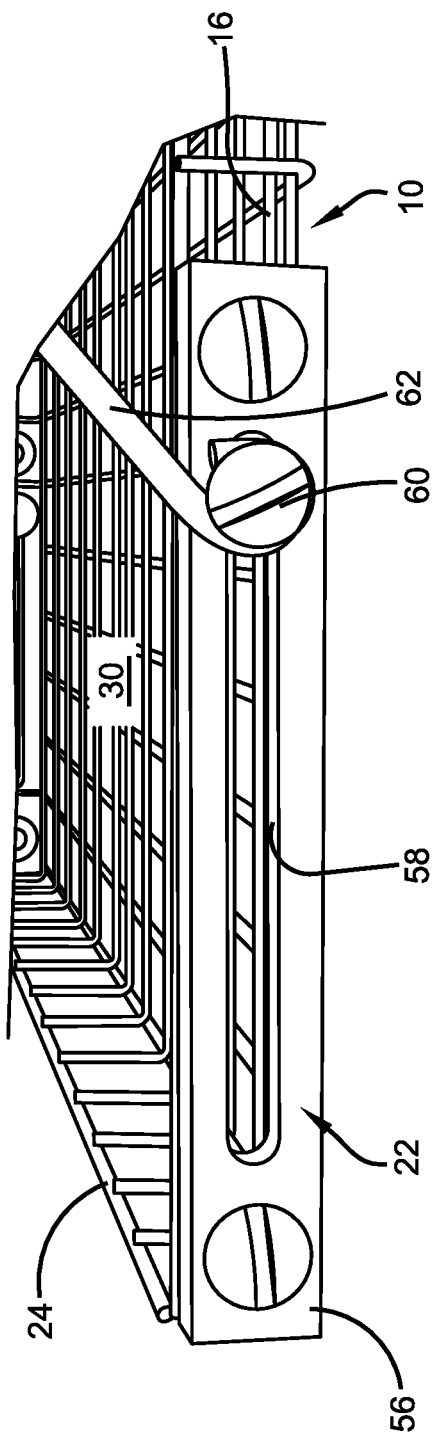
FIG. 8 is yet another enlarged view of the device depicting the sliding mechanism that is used to move the upper portion forward and rearwardly relative to the lower portion of the device.
Figure 9:
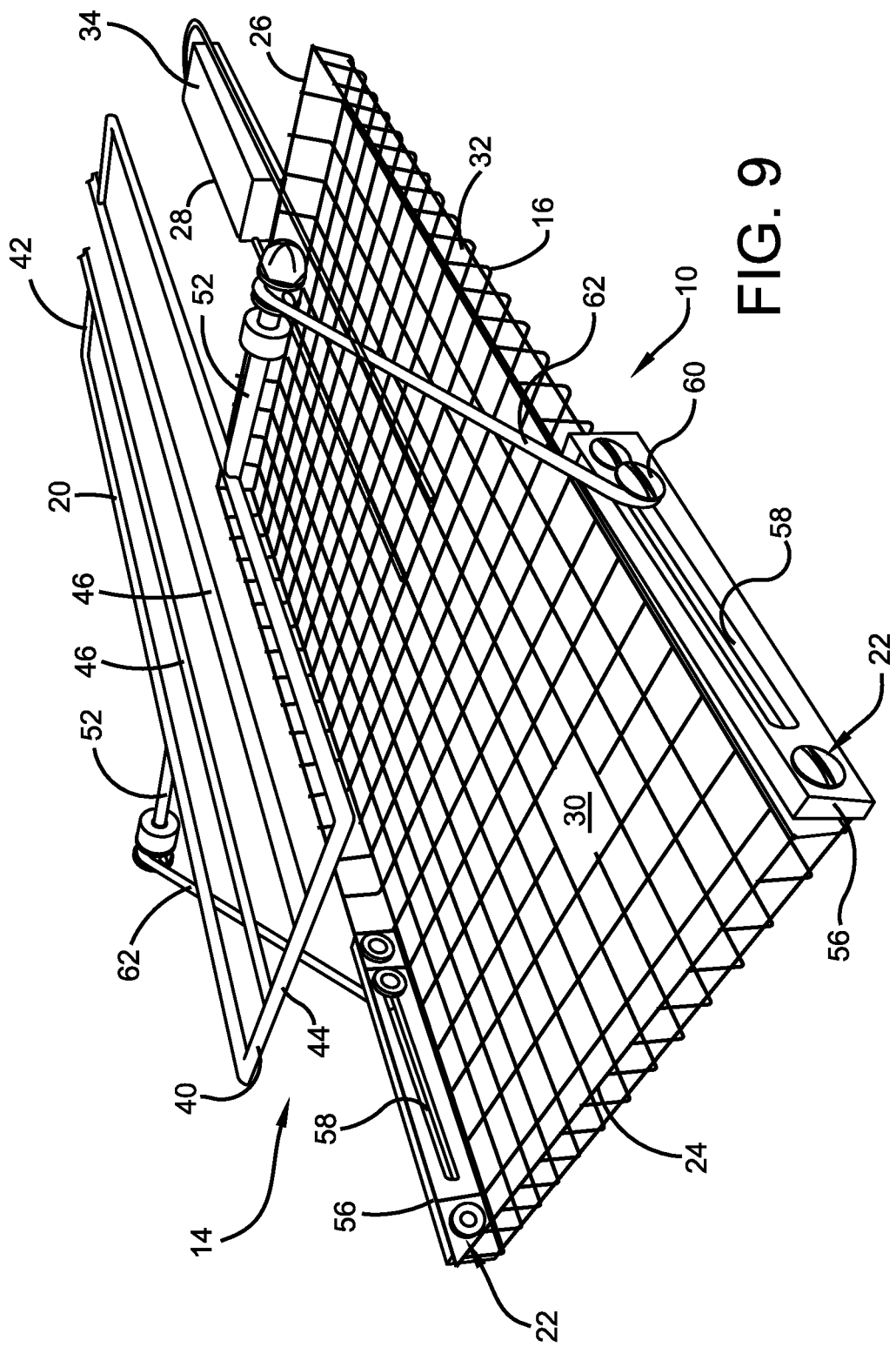
FIG. 9 is a perspective view of the device with the upper portion in a fully open position, showing the area where food may be deposited onto the lower portion.

FIGS. 7-9 depict one embodiment of a slider, adjustment mechanism 22 that can be used with the device 10. As shown, the slider mechanism 22 is coupled to opposite outer side edges of the lower portion 16 and to the transverse rod 52 of the upper portion 20. The slider/adjustment mechanism 22 includes two slot members 56 that are coupled to the lower portion 16 and that include a slot or groove 58. The slot members 56 include linearly extending slots/grooves 58 for mating with a pin 60. The slot member 56 is a substantially rectangular member having a slot or groove 58 cut into the rectangular member 56 and extending along the length L4 of the rectangular member. Each of the slot members 56 is connected to a side wall of the lower portion 16 and positioned at the front edge 24 of each side of the lower portion 16. A pin 60 is positioned in each of the slots 58 of the sliding mechanisms 22 and slides in each of the slots 58 and provides the forward and rearward translational motion of the upper portion 20 relative to the lower portion 16. The pins 60 extend inwardly and are capped on the inner side so that the pins 60 remain positioned in the slots 58 and are not easily removed.

The slot members 56 may be coupled to the lower portion 16 in any known manner or could be integrally formed in the side wall of the lower portion 16. Each of the pins 60 is coupled to an arm 62 and each arm 62 is coupled to a connector 64 that is coupled to the outwardly extending rods 52 of the upper portion 20. The arms 62 are rotationally coupled to the rods 52 of the upper portion 20 and to the pin 60 of the lower portion 16, with the pin 60 that slides in the slot 58 of the slot member 56 being configured to slide forward and backward inside the slot 58. The arms 62 that are coupled to the pins 60 permit rotation of the upper portion 20 relative to the lower portion 16 so that the upper portion 20 can rotate upwardly to a height that is substantially the same as the length L5 of the arms 62. The rotation of the arms 62 is what permits the upper portion 20 to move up and down to allow food to be positioned in the lower portion 16 of the grilling basket 10.

In addition, the height positioning of the upper portion 20 becomes adjustable by simply moving the upper portion 20 down or up depending upon the type of food positioned in the lower portion 16 of the grilling basket 10. The arms 62 are rigid and have a strength sufficient to hold the weight of the upper portion 20. The slider mechanism 22 promotes height adjustability so that the device 10 can be used with various thickness foods, such as differently size hot dogs 2, sausages, corn-on-the cob, or other foods.

The rectangular slot member 56 does not have to be rectangular. Moreover, other ways are known for providing a slider mechanism 22 and any known type of slider mechanism 22 can be utilized with the invention. For example, other types of slider mechanisms 22 may include fixed or flexible hinges, spring designs, piston design, or other designs.

Figure 10:
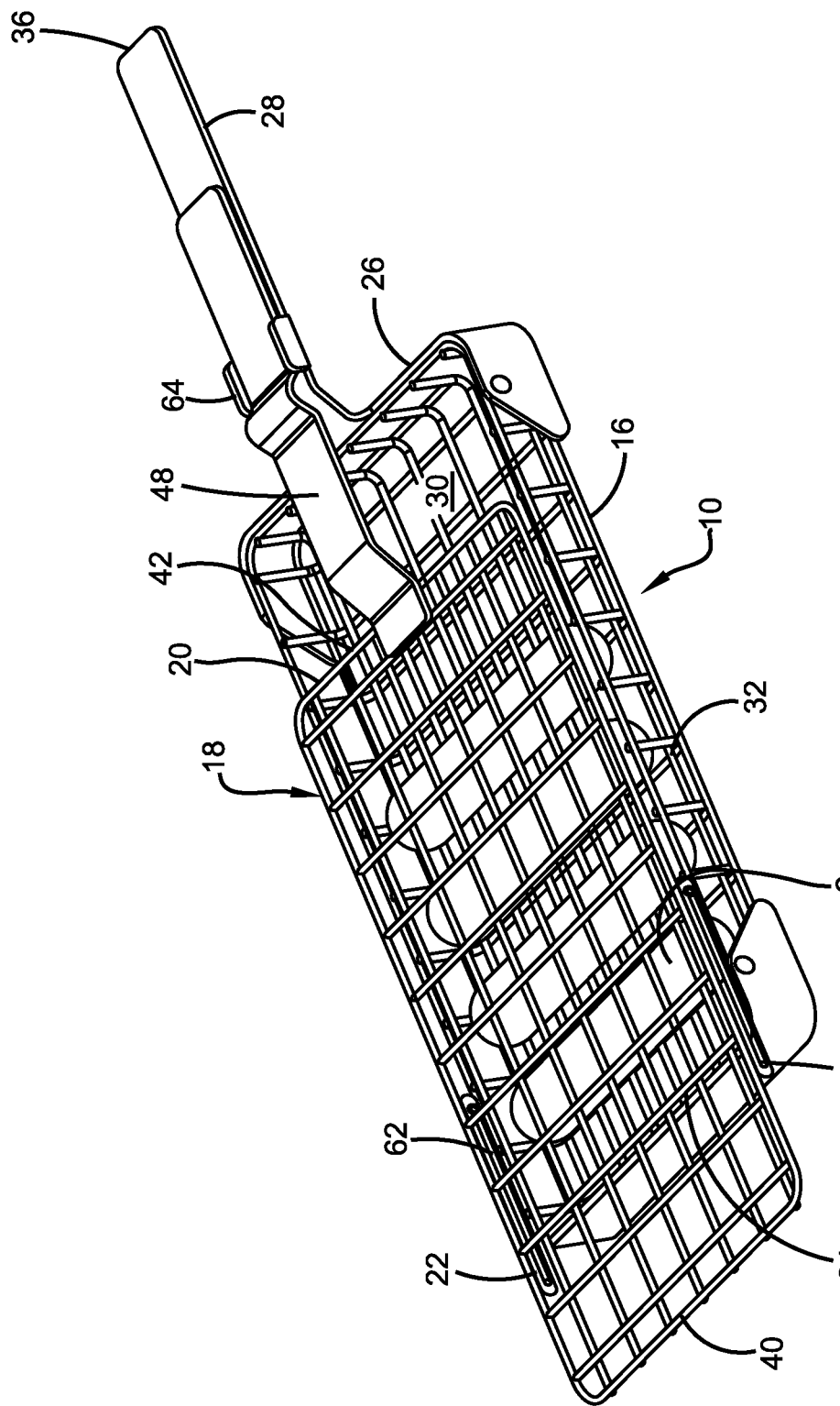
FIG. 10 is an alternative embodiment of the device showing the upper portion of the device being slidable relative to the lower portion.

FIG. 10 depicts an alternative embodiment of the grilling basket 10 where the upper portion 20 of the grilling basket 10 entirely or substantially entirely covers the lower portion 16. In this embodiment, the slider mechanism 22 slot member 56 is coupled to a side edge of the upper portion 20 and an arm 62 couples the upper portion 20 to the lower portion 16. In this embodiment, the upper portion 20 is permitted to travel forward past the front edge 24 of the lower portion 16, in addition to moving rearwardly and upwardly. As is evident, the slot member 56 can be coupled to either the upper portion 20 or the lower portion 16 in any of the above embodiments with proper modifications. However, if the upper portion 20 has a width that is narrower than the width of the lower portion 16, placement of the slot mechanism 56 on the lower portion 16 side wall is advantageous because it does not require modification of the upper portion 20.

As discussed above and shown in the Figures, the upper portion moves upwardly and opens to reveal the front and back of the lower portion. It should be recognized that, if desired, the slot members 56 and sliding mechanisms 22 could be associated with the front and rear walls instead of with the side walls, so that the device 10 will open from the sides instead of from the front and rear.

In this embodiment, to load food 2 into the lower portion 16, a user moves the upper portion 20 forwardly and upwardly until there is space to place food in the lower portion 16. The upper portion 20 can move forward of the front edge 24 of the lower portion 16 to provide room for inserting food. In addition, the upper portion 20 is shown as having a grid pattern that substantially matches the grid pattern of the lower portion 16. The upper portion 20 has a length L3 and width W3 that is substantially the same as the length L and width W of the lower portion 16.

As discussed above, friction between the upper portion 20, the food 2, and the lower portion 16 permits the food 2 to roll over when the upper portion 20 is moved relative to the lower portion 16. In order to aid in promoting rolling, a downward facing surface treatment may be applied to the lower side of the upper portion 20 and/or an upwardly facing surface treatment may be applied to the bottom wall of the lower portion 16. This surface treatment may be any type of treatment that promotes friction, such as, notching, teeth, or an abrasive surface treatment that provides proper gripping of the food 2. Moreover, if desired, a mechanism can be utilized to provide downward force on the upper portion 20 so that, when closed in position over the food 2, the upper portion applies a downward force or tension on the food. One type of device that could be used to apply downward force is a spring mechanism or a spring-like device.

The grilling basket 10 is shown as being substantially rectangular in shape and having a size that permits its use on any number of differently sized grills, barbeques, and various other cooking devices. The components of the grilling basket 10 are conducive to grilling, barbequing and smoking all types of food and can be made from a metal material or other materials that can withstand the heat from the grill. The upper and lower portions 20, 16 are formed from materials that permit the upper and lower portions 20, 16 to support any food placed therein for transporting food to and from the grill and for cooking the food on a grill. The grilling basket 10 provides a surface for the food to move back and forth in the lower portion 16 of the grilling basket 10 to promote even, distributed cooking.

The grilling basket 10 also secures the food in place when food repositioning is not needed. The upper portion 20 exerts a force on the food 2 in the grilling basket 10 and friction between the upper portion 20 and the food provides for a grip-like arrangement that permits the food 2 to move forward and backward between the upper and lower portions 20, 16 of the grilling basket 10. This friction turns or rolls the hot dogs 2 uniformly, which promotes even cooking and assists in preventing burning of the food. As discussed above, the friction between the food 2 and the upper and lower portions 20, 16 helps to prevent the hot dogs 2 from moving back to a previous cooking position and helps to maintain the food 2 in the grilling basket 10, even when the grilling basket 10 is being moved.

The construction of the grilling basket 10, including the upper portion 20 and lower portion 16, is not limited only to rigid materials. Similar features and functionality may be obtained by utilizing other types of rigid, semi-rigid, flexible, mesh or other materials that foster movement and mechanical support while promoting overall general cooking/grilling/barbecuing.

The handle 48 of the upper portion 20, e.g., upper handle 48, provides a gripping member that allows the user to open or close the lower portion 16 of the grilling basket 10 to load and unload the food, to secure the food, and to manipulate the rolling motion of the food quickly and simultaneously by turning/rolling the hot dogs 2 together. The lower handle 28 that extends from the lower portion 16 is used to carry the cooking device 10 to and from the barbecue/grill. The upper handle 48 is rigid or semi-rigid and is mechanically attached to the upper portion 20.

The upper handle 48 is not limited to being attached to the rear end 42 of the upper portion 20 but could also or alternatively be coupled to the front end 40 of the upper portion 20. The upper handle 48 could also be attached to a central area of the upper portion 20. The lower handle 28 is shown as being attached to the lower portion 16 at the rear edge 26 thereof but could also or alternatively be coupled to the front edge 24 of the lower portion 16. Handles could also be coupled to the sides of the lower portion 16.

In use, the grilling basket 10 is used by first raising the upper handle 48 so that the upper portion 20 is raised upwardly relative to the lower portion 16. Food 2 can then be inserted into the lower portion 16 of the grilling basket 10 such that it is positioned near the rear edge 26 of the lower portion 16. Then the upper portion 20 should be positioned so that the pins 60 of the slider mechanism 22 are located at the rear end of the slot 58 in the slider mechanism 22, and the upper portion 20 can then be moved downwardly until the upper portion 20 is frictionally coupled to the food 2. Using the lower handle 28, the grilling basket 10 may then be transported to the cooking surface if not already there. After the food 2 begins to grill and is ready to be turned, the upper handle 48 can be used to move the upper portion 20 forward. As the upper portion 20 moves forwardly, the pin 60 in the slot 58 of the slider/adjustment mechanism 22 will move forward in the slot 58.

As the upper portion 20 is moved forward, the food 2 in the lower portion 16 will be rolled towards the front edge 24 of the lower portion 16 while the lower portion 16 remains stationary. The food 2 can be completely rolled over or can partially be rolled over, such as turn. This motion of moving the food 2 forward is repeated until the food 2 has completed a complete turn. Then, if desired, the user can again move the upper portion 20 rearwardly or forwardly if additional cooking and rolling of the food 2 is necessary. Once the cooking is completed, the upper handle 48 can be used to lift the upper portion 20 relative to the lower portion 16 to permit access to the food 2 in the lower portion 16.

The design is advantageous in that it permits a user to easily position hot dogs 2 on a grill and easily remove hot dogs 2 from a grill without having to physically remove them from the grilling basket 10, preventing fallen hot dogs 2. The hot dogs 2 can be transferred to a serving plate or buns either from the grill, or after the device 10 is moved to a safer location.

Figure 12:
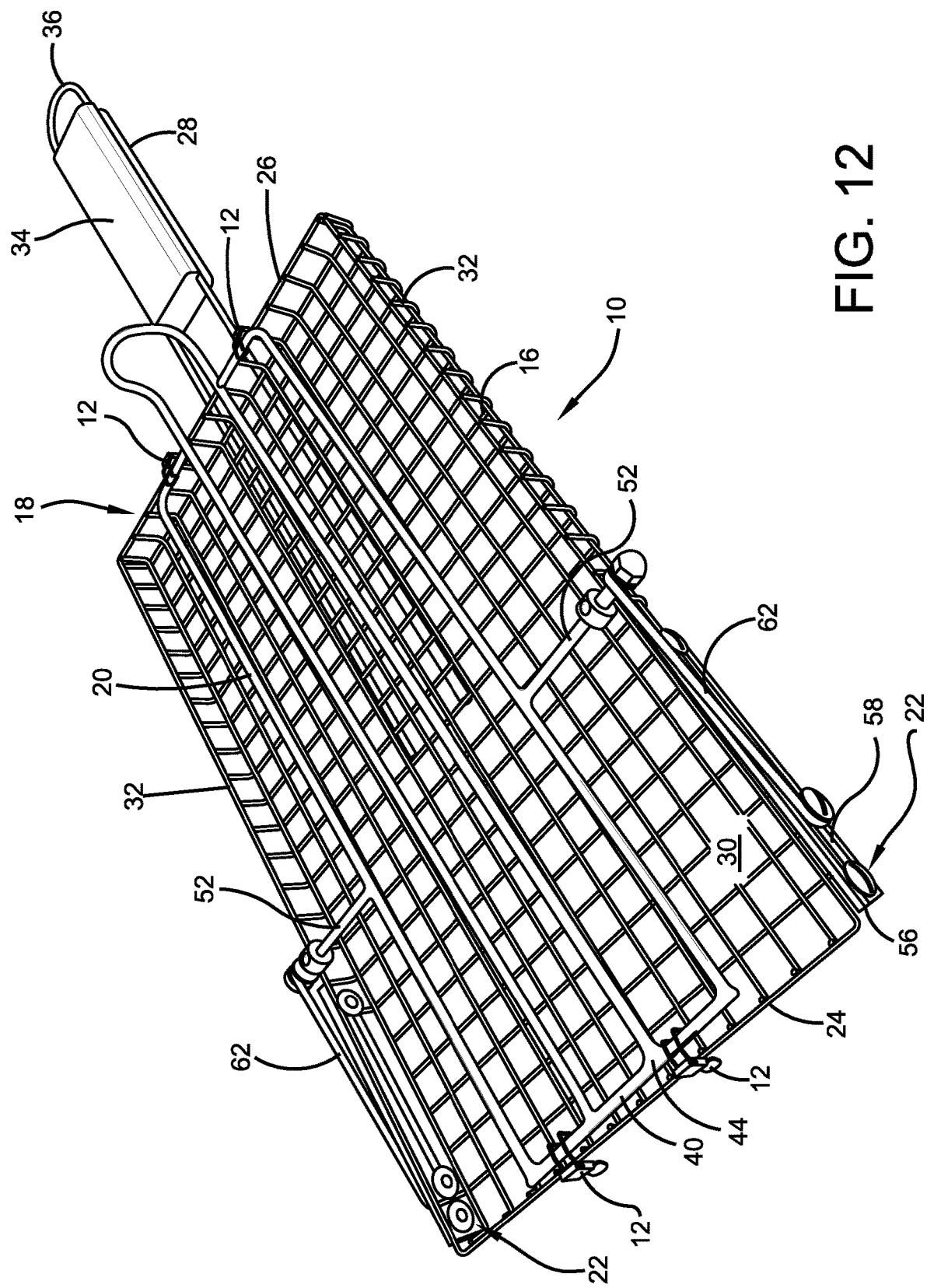
FIG. 12 is an alternative embodiment of the device showing hooks installed at the ends of the upper and lower portions of the device to lock the upper portion in position to hold any food inside the basket during cooking and/or transport of the basket to and from the cooking source.

FIGS. 12 and 13 depict an alternative embodiment of the invention that includes clips or hooks 12 for coupling the upper portion 20 to the lower portion 16 of the grilling basket 10 when rolling of the food is not needed. In this embodiment, removable clips or hooks 12 are used to couple the upper portion 20 to the lower portion 16. As shown, four clip locations 68 may be utilized, two at the front end and two at the rear end of the grilling basket 10. One type of latch that can be utilized is the toggle latch design 70 shown in FIG. 13. Other types of hooks or latches may be used. In addition, when the upper portion 20 is latched to the lower portion 16, the user can simply flip over the grilling basket 10 so that the food can cook on both sides. This configuration may be useful for cooking vegetables, fish, chicken, or the like, which typically flatten when they are cooked.

The addition of the latches 12 provides the grilling basket 10 with more universal usage, so that it can be used as a conventional grilling basket 10 as well as a basket 10 for turning food. When the grilling basket 10 is used to roll food, the latches 12 are not engaged.

Any type of latch or lever 12 may be used to latch the upper portion 20 to the lower portion 16 for flipping the basket 10 during cooking. The latches 12 may be positioned at any desired location and in any number, as long as they serve the purpose of latching the upper portion 20 to the lower portion 16. Moreover, as discussed above, the upper portion 20 can have a larger size and could also be configured like a basket, similar to the lower portion 16. In that instance, it may be possible to use a fewer number of hooks/latches 12, or a greater number of hooks/latches 12. While FIG. 12 shows the latches 12 being coupled to the upper portion 20 with hooks 12 that engage the lower portion 16, the opposite could also be used, with the latches 12 being coupled to the lower portion 16 and hooking onto the upper portion 20 when latched.

The upper and lower portions 20, 16 may be made of steel, such as stainless steel. Other materials may also be utilized, as will be recognized by those of skill in the art.

While not shown, if desired, the grilling basket 10 could include multiple compartments to permit turning of multiple foods. Alternatively, the grilling basket 10 could include compartments that permit turning of the food while other compartments do not permit turning of the food. For example, compartments could be placed on the outer sides of the device 10 that are not associated with the upper portion 20 while compartments positioned centrally under the upper portion 20 would permit turning of the food. For the compartments that are positioned on the outer sides of the device 10, covers could be provided that permit the food in the non-turning compartments to be held in position in the compartments, such that if a user wishes to flip the grilling basket 10, the food in the compartments would be maintained in position.

The embodiment shown in FIGS. 1-9 may have the following approximate dimensions. The length L of the lower portion 16 may be approximately 13 inches, with the side walls of the lower portion 16 having a height of about 0.625 inches, with spacing between the wires of the lower portion base wall being approximately the same as the height of the side walls. The spacing between the wires of the grilling basket 10 could also be about 0.25 to 0.75 inches, for example. The width of the lower portion 16 may be about 7.5 inches.

The upper portion 20 may have a width that is about 4.0 inches, with spacing between the four longitudinally extending rods of the upper portion 20 being approximately 1.33 inches. The length L3 of the upper portion 20, not including the length L6 of the upper handle is about 13 inches. The rods of the upper portion 20 have a diameter of about 0.15 inches. The length L6 of the upper handle is about 1.25 inches and the height H of the upper handle is about 1.2.5 inches. The total length L7 of the upper portion 20, including the upper handle, may be approximately 14.375 inches. The length L8 of the transversely extending beams of the upper portion 20 may be about 2.25 inches.

The length L2 of the lower handle may be about 10 inches. As shown, the lower handle has a solid, wooden portion that is about 5.75 inches long and is spaced from rear edge 26 of the lower portion 16 of the grilling basket 10 by about 2.75 inches. The open loop at the end of the handle has a length of about 1.5 inches. The handle may have a width of about 1.375 inches. The loop at the end of the lower handle can be used to hang the grilling basket 10 on a hook when not in use. The space between the wooden portion of the handle and the lower portion 16 provides the user with space between the heat source and the handle.

The length L4 of the slot member of the sliding mechanism 22 may be about 4.25 inches or about 4.15 inches. The length L5 of the arm of the sliding mechanism 22 may be about 3.5 inches. The diameter of the arm may be about 0.12 inches. As will be readily recognized any, number of different dimensions may be used, the above dimensions only being provided as one example.

A food grilling device 10 includes a lower portion 16 for holding food, an upper portion 20 for trapping food between the upper and lower portions 20, 16, and a sliding, adjustment mechanism 22. The upper portion 20 is positioned over the lower portion 16 and is movable relative to the lower portion 16. The sliding, adjustment mechanism 22 is coupled between the lower portion 16 and the upper portion 20. The adjustment mechanism 22 permits the upper portion 20 to move forward, rearwardly, upwardly, and downwardly relative to the lower portion 16. The food grilling device 10 has an open position 14 and a closed position 18. In the open position 14, food is inserted between the lower and upper portions 16, 20. In the closed position 18, food is trapped in the food grilling device 10 by pressure or friction exerted on the food by the upper portion 20. Movement of the upper portion 20 relative to the lower portion 16 in a forward and rearward direction turns the food 2 positioned between the upper and lower portions, 20, 16.

The lower portion 16 may be shaped like a basket having a base wall and upwardly extending side walls. The base and side walls may be defined in a grid pattern. The lower portion 16 may include at least one handle extending outwardly from the lower portion 16 for transporting the grilling basket 10. The lower portion 16 may be a mesh wire grid basket. The lower portion 16 may include multiple compartments for housing different types of food.

The upper portion 20 may be substantially planar and may include at least one handle that extends upwardly from the substantially planar upper portion 20. The upper portion 20 may be a mesh wire grid basket. The upper and lower portions 20, 16 may be made of steel or stainless steel. The upper portion 20 may be basket-shaped, being a mirror image of the lower portion 16, if desired.

The sliding, adjustment mechanism 22 may include a slot coupled to the lower portion 16 and a pin coupled to the upper portion 20 and the slot. The sliding, adjustment mechanism 22 may also include an arm extending between the pin and the upper portion 20. The sliding, adjustment mechanism 22 may have a configuration that permits both translational, horizontal movement of the upper portion 20 relative to the lower portion 16 and rotational, vertical movement of the upper portion 20 relative to the lower portion 16. The sliding, adjustment mechanism 22 may permit translational movement of the upper portion 20 relative to the lower portion 16. The sliding adjustment mechanism 22 may permit both translational motion along the longitudinal axis X-X and vertical rotational motion of the upper portion 20 relative to the lower portion 16.

A latch may be coupled between the upper portion 20 and the lower portion 16 to couple the lower and upper portions 16, 20 together so that movement between the upper and lower portions 20, 16 is not permitted.

In another embodiment, a grilling basket 10 may include a lower fixed basket portion, an upper movable portion, and a joint coupled between the lower and upper portions 16, 20. The lower fixed basket portion has a length L and a width W. A longitudinal axis X-X is defined along the length L of the lower portion 16. The lower portion 16 includes a base wall and a plurality of side walls defining a top edge of the lower portion 16. The upper movable portion defines at least a top wall of the grilling basket 10. The joint coupled between the lower and upper portions 16, 20 permits at least translational movement of the upper portion 20 relative to the lower portion 16. The joint couples the lower portion 16 to the upper portion 20 and provides both translational motion between the upper and lower portions 20, 16 along the longitudinal axis X-X and vertical motion between the upper portion 20 and the lower portion 16 between a closed position 18 and an open position 14. The lower position is substantially aligned with the top edge of the lower basket side walls. The upper position is above the top edge of the lower basket side walls. The upper portion 20 is movable between the upper position and the lower position and slidable along the longitudinal axis X-X.

The joint may be a sliding mechanism 22 that permits both translational movement of the upper portion 20 relative to the lower portion 16 and vertical movement of the upper portion 20 relative to the lower portion 16. The sliding mechanism 22 may include a pair of members having a longitudinally extending slot coupled to the side walls of the lower portion 16, a pin coupled to each of the slots that is slidable in the corresponding slot, and an arm coupled to each of the pins at one end and to the upper portion 20 at the other end. The arm may be rotationally coupled to the pin and an appendage of the upper portion 20. The upper portion 20 may be vertically movable relative to the lower portion 16 a height that is substantially equal to the length L6 of the arm of the sliding mechanism 22. When food is positioned in the lower portion 16 and the upper portion 20 is exerting a force on the food, the food is movable by translating the upper portion 20 relative to the lower portion 16 along the longitudinal axis X-X. The force applied to the food causes the food to roll an amount equal to the translational movement of the upper portion 20 and helps to maintain the food in the lower portion 16.

The term "substantially," if used herein, is a term of estimation.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A food grilling device having a length and a width, with a longitudinal axis extending along the length, said device comprising:
    a lower portion for holding food;
    an upper portion positioned over the lower portion and being movable relative to the lower portion; and
    a sliding, adjustment mechanism coupled between the lower portion and the upper portion, said adjustment mechanism permitting the upper portion to move forward, rearwardly, upwardly, and downwardly relative to the lower portion,
    wherein the food grilling device has an open position and a closed position, and in the open position, food is inserted between the lower and upper portions, and in the closed position, food is trapped in the food grilling device by pressure or friction exerted on the food by the upper portion, and sliding movement of the upper portion relative to the lower portion along the length in a forward and rearward direction rolls the food positioned between the upper and lower portions.

2. The device of claim 1, wherein the lower portion is basket-shaped having a base wall and upwardly extending side walls, with the base wall and the side walls being defined in a grid pattern.

3. The device of claim 2, wherein the lower portion further comprises at least one handle extending outwardly from the lower portion for transporting the grilling device.

4. The device of claim 1, wherein the upper portion is substantially planar and includes at least one handle that extends upwardly from the substantially planar upper portion.

5. The device of claim 1, wherein the sliding, adjustment mechanism includes a slot coupled to the lower portion and a pin coupled to the upper portion and the slot.

6. The device of claim 5, wherein the sliding, adjustment mechanism further comprises an arm extending between the pin and upper portion.

7. The device of claim 1, wherein the sliding, adjustment mechanism has a configuration that permits both translational, horizontal movement of the upper portion relative to the lower portion and rotational, vertical movement of the upper portion relative to the lower portion.

8. The device of claim 1, further comprising at least one latch coupled between the upper portion and the lower portion to couple the lower and upper portions together so that movement between the upper and lower portions is not permitted.

9. The device of claim 1, wherein the lower portion is a mesh wire grid basket.

10. The device of claim 1, wherein the lower portion has multiple compartments for housing different types of food.

11. The device of claim 1, wherein the upper portion is a mesh wire grid basket.

12. The device of claim 1, wherein the upper and lower portions are made of steel or stainless steel.

13. The device of claim 1, wherein the sliding, adjustment mechanism permits translational movement of the upper portion relative to the lower portion.

14. The device of claim 1, wherein the sliding, adjustment mechanism permits both translational motion along the longitudinal axis and vertical rotational motion of the upper portion relative to the lower portion.

* * * * *